Figure 1:
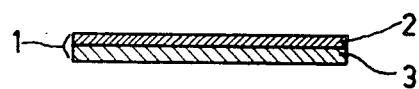

United States Patent [19]

Magendans et al.

[11] 4,331,902
[45] May 25, 1982

[54] LAMINATED ROTARY ANODE FOR X-RAY TUBE

[75] Inventors: Frederik Magendans; Bernhard J. P. Van Rheenen, both of Eindhoven, Netherlands

[73] Assignee: U.S. Philips Corporation, New York, N.Y.

[21] Appl. No.: 129,134

[22] Filed: Mar. 10, 1980

Related U.S. Application Data

[60] Division of Ser. No. 907,991, May 22, 1978, Pat. No. 4,224,273, which is a continuation of Ser. No. 621,484, Oct. 10, 1975, abandoned, which is a continuation of Ser. No. 418,581, Nov. 23, 1973, abandoned.

[30] Foreign Application Priority Data

Dec. 7, 1972 [NL] Netherlands .......................... 7216588

[51] Int. Cl.³ .............................................. H01J 35/08
[52] U.S. Cl. .................................... 313/330; 313/60; 313/311
[58] Field of Search .................... 313/330, 60, 55, 311

[56] References Cited

U.S. PATENT DOCUMENTS

| | | | |
|---|---|---|---|
| 3,622,824 | 11/1971 | Atlee | 313/60 |
| 3,649,355 | 3/1972 | Hennig | 313/311 |
| 3,790,838 | 2/1974 | Baum | 313/60 |
| 3,836,807 | 9/1974 | Schreiner et al. | 313/60 |
| 3,863,083 | 12/1975 | Schram | 313/330 |
| 3,869,634 | 3/1975 | Konieczynski | 313/60 |
| 3,936,689 | 2/1976 | Birjukova et al. | 313/330 |

*Primary Examiner*—Saxfield Chatmon, Jr.
*Attorney, Agent, or Firm*—Paul R. Miller

[57] ABSTRACT

A laminated rotary anode for use in an X-ray tube is provided having a structure of a first electron target layer being essentially of a first tungsten alloy, a second intermediate layer bonded to the electron target layer and consisting essentially of either tungsten or a second alloy of tungsten and having a yield point lower than that of the first tungsten alloy, and a support layer bonded at a face of the second layer with the support layer consisting essentially of one of molybdenum and molybdenum alloy.

2 Claims, 4 Drawing Figures

LAMINATED ROTARY ANODE FOR X-RAY TUBE

This is a divisional application of Ser. No. 907,991 filed May 22, 1978, now U.S. Pat. No. 4,224,273, issued Sept. 23, 1980, which was a continuation of application Ser. No. 621,484, filed Oct. 10, 1975, now abandoned, which in turn was a continuation of application Ser. No. 418,581, filed Nov. 23, 1973, now abandoned.

The invention relates to a method of manufacturing laminated rotary anodes for use in X-ray tubes which comprise target areas mainly consisting of tungsten and supports mainly consisting of molybdenum, and to rotary anodes made by this method.

Netherlands patent application No. 6,916,885, corresponding to U.S. Pat. No. 3,735,458, (British patent specification No. 1,308,679) described a method of manufacturing a laminated rotary anode for use in an X-ray tube which comprises a target area for the electrons which is made substantially of tungsten and a support which is made substantially of molybdenum. In this known method a disc-shaped piece consisting mainly of tungsten is joined to a disc-shaped piece consisting mainly of molybdenum by a high-speed forming impact process in which the diameters of the two disc-shaped pieces are increased and their thicknesses are decreased. The stresses of the resulting member are relieved by annealing and the member is then shaped into the desired anode.

The term "high-speed forming impact process" in this connection is to be understood to mean a forming process in which a workpiece is shaped by means of a small number of blows, preferably by a single blow of large energy content, in a machine provided with plane die blocks. Machines for carrying out such a method are known and commercially available. Very good results are obtainable by means of a machine in which the die blocks are moved together at a high speed driven by a compressed gas (generally referred to as a pneumo-mechanical machine).

The part of the surface of a rotary anode for an X-ray tube on which the electrons impinge, which is generally referred to as the focal spot track, is subjected to greatly fluctuating thermal stresses. These thermal stresses give rise to roughening of the focal-spot track and hence to a reduction of the X-ray output. As is known, the addition of certain high-melting-point metals to tungsten which increase its ductility, enables the time of operation in which a certain degree of roughening is produced with the same load, to be prolonged. One of the best known alloying metals used for this purpose is rhenium, but the literature further mentions tantalum, osmium, iridium, platinum, ruthenium, rhodium and palladium in this respect.

In the abovedescribed method it is necessary for both disc-shaped pieces to have their diameters increased to substantially the same extent by the forming process. In the aforementioned patent specification it is stated that for this purpose the deformabilities of the disc-shaped pieces are matched by a suitable choice of their thicknesses, of the temperature used and of the nature and the properties of the materials the pieces consist of.

It has been found in practice that sometimes the resulting assemblies are unsuitable for being made up into rotary anodes. This may be the case, for example, if for satisfactory matching of the deformabilities the thicknesses of the disc-shaped pieces have to be chosen so that the thicknesses of the layers obtained after forming are too small for the intended purpose. Also the layer thicknesses of the disc-shaped pieces dictated by the ultimate purpose may require the use of materials which are less suitable, or are not the best choice, for the intended purpose.

Difficulties of this nature occur in particular when a disc-shaped piece consists of a tungsten-rhenium alloy having a rhenium content in excess of about 2% by weight and the other piece consists of a molybdenum alloy which in order to raise the recrystallisation temperature and to increase the mechanical strength at elevated temperatures contains, for example, small amounts of titanium and/or zirconium and optionally carbon, as is the case with the molybdenum alloys available under the tradenames TZM and TZC. According to Braun in "Metall" 16, (1962), page 992, TZM contains from 0.40% to 0.55% by weight of titanium, from 0.06% to 0.12% by weight of zirconium, the remainder being molybdenum, and TZC contains about 1.25% by weight of titanium, from 0.15% to 0.25% by weight of zirconium and from 0.15% to 0.30% by weight of carbon, the remainder being molybdenum.

It is an object of the present invention to provide a method of manufacturing rotary anodes for use in X-ray tubes in which the above difficulties are avoided and by which rotary anodes for X-ray tubes are obtained in which the layers sufficiently adhere to one another and are thick enough for the intended use.

According to the invention this is attainable by means of a method which is characterized in that a laminated disc-shaped member, which comprises a layer consisting of a tungsten alloy suitable for use as a target layer for the electrons and a layer consisting of a metal having a lower yield point than the aforementioned tungsten alloy and consisting of tungsten or a tungsten alloy, is joined by the latter layer to the disc-shaped piece mainly consisting of molybdenum by means of the high-rate impact shaping process.

By means of the method according to the invention a rotary anode for an X-ray tube having a target area for the electrons may be manufactured from many tungsten alloys which in the known method gave rise to difficulties because their deformabilities at the forging temperatures used differ too widely from those of the materials of the support. Moreover, the use of the laminated member generally results in an improvement of the adherence to the molybdenum alloy support.

The laminated members may be obtained by various methods, for example by forging together presintered or cast discs, by spraying one of the layers on to a presintered or cast disc, for example by plasma arc spraying and subsequent sintering of the sprayed layer. Preferably a laminated sintered member is used which is obtained by sintering together layers of powders of the metals or alloys in a mold.

Figure 2:
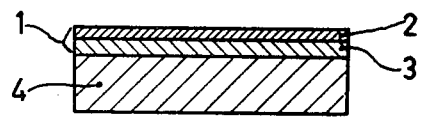
Figure 3:
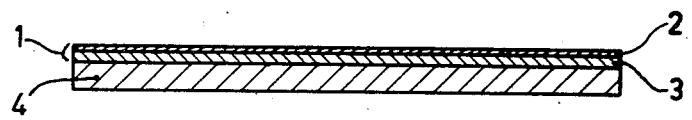
Figure 4:
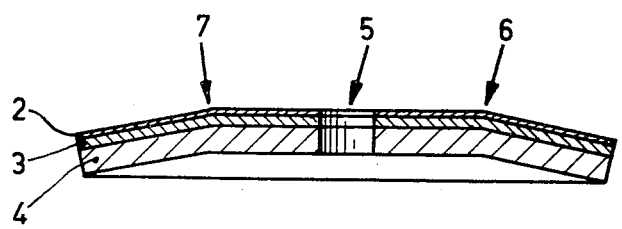

The invention will now be described more fully, by way of example, with reference to the accompanying diagrammatic drawings, in which:

FIG. 1 is a sectional view of a sintered laminated member comprising two layers, FIG. 2 is a sectional view of the structure of a set of discs before shaping, FIG. 3 is a sectional view of the structure of this set after shaping, and FIG. 4 is a sectional view of a finished rotary anode.

In a suitable mold an amount of powdered tungsten or powdered tungsten alloy is scattered in an even layer, after which an amount of the powdered tungsten alloy for the target area is distributed over the first layer. Obviously this order may be reversed. The assembly is compressed and sintered in a non-oxidizing or reducing atmosphere to form the sintered laminated member 1 shown in FIG. 1. The layer 2 consists of the alloy desired for the target area and the layer 3 consists of tungsten or a tungsten alloy having a lower yield point and better deformability than the first-mentioned tungsten alloy.

The unitary member 1 then is placed on a disc-shaped member 4 consisting of a molybdenum alloy with the layer 3 facing the member 4. The assembly is heated to the desired deformation temperature and then subjected to a high-speed forming impact process.

Subsequently the two pieces 1 and 4 are joined to one another by means of a flow of high energy content, their diameters being increased and their thicknesses being reduced to an at least substantially equal extent (FIG. 3). After the resulting laminated assembly has been taken from the press any stresses in it are relieved by annealing. Then the assembly may be bent at points 6 and 7 and may have a hole 5 formed in it for receiving a spindle and the edge may be finished, resulting in the rotary anode shown in FIG. 4.

In order to prevent oxidation of the disc-shaped pieces 1 and 4 during the heating and subsequent forming operations they are preferably enclosed in a thin-walled envelope made of a material which does not melt during the heat treatment and is inert with respect to the materials of the discs, which thus are heated and subjected to the high-speed forming impact process together with and in the envelope. Such an envelope may consist of tungsten or molybdenum sheet and may be removed after the forming operation.

The high-speed forming impact process provides vary good adherence between the two disc-shaped pieces. During the forming process in which the thicknesses of the disc-shaped pieces decrease and their diameters increase, oxide films on their surfaces of contact are broken up and fresh materials from both layers which have not been in contact with the atmosphere before are intimately contacted at a very high pressure and an elevated temperature resulting in an excellent bonding of the pieces to each other.

Sintered members having a density of about 85% to 95% of the theoretically possible density may suitably be used in the method according to the invention. The porosity of the sintered member can be controlled in known manner by compressing the material before the sintering and by the manner of sintering. The disc-shaped piece from which the support of the rotary anode is formed preferably consists of a material having a density of at least 90% of the theoretically possible density.

It has been found that the thickness ratio between the layers of the sintered member is not very critical. If the thickness of the target layer which consists of the tungsten alloy is fixed, the thickness of the other layer may, for example, be one half of this thickness, be equal to it or be twice this thickness. Any thickness ratio lying between these values may be used. The overall thickness of the sintered member may be a few mm.

By the method according to the invention rotary anodes for use in X-ray tubes can be made having a target area consisting of alloys of tungsten with one or more of the metals rhenium, tantalum, osmium, iridium, platinum, ruthenium, rhodium and palladium, an intermediate layer consisting of tungsten or a tungsten alloy, and a supporting layer consisting of alloys of molybdenum containing small amounts of one or more elements chosen from the group consisting of titanium, zirconium, carbon, hafnium and boron.

EXAMPLE I

In a cylindrical mould of a diameter of 50 mm an even layer of powdered tungsten is spread which is then covered by a layer of a powder of a tungsten-rhenium alloy containing 4.5% by weight of rhenium. The assembly then is compressed at a pressure of 2.5 tons/cm$^2$ and sintered in a reducing atmosphere at a temperature of 2200° C.

The resulting disc 1 is placed on a disc 4 of equal diameter consisting of a cast molybdenum alloy containing 0.5% by weight of titanium and 0.08% by weight of zirconium. The assembly is heated to a temperature of about 1600° C. and then is formed in a pneumo-mechanical machine in a single blow into a disc having a diameter of 120 mm. The thickness of the assembly then is about 8 mm. Any stresses are relieved by annealing at a temperature of 1000° C., after which the assembly is made up into a rotary anode by known methods. In this embodiment the thickness of the tungsten-rhenium layer 2 is 0.8 mm, that of the tungsten layer 3 is 1.2 mm and that of the support 4 is 4 mm.

Similarly, in manufacturing rotary anodes sintered members were used in which the upper layer consisted of a tungsten-rhenium alloy containing 4.5% by weight of rhenium and the other layer consisted of tunsten-rhenium alloys chosen from the group consisting of such alloys comprising 0.5% by weight of rhenium, 1% by weight of rhenium, 1.5% by weight of rhenium and 2% by weight of rhenium respectively. In all cases equal deformation of and good adherence between the sintered member and the support member were obtained by the forming process.

EXAMPLE II

According to the method described in example I a rotary anode was manufactured by joining a sintered member comprising a layer of a tungsten-niobium alloy containing 2% by weight of niobium, the remainder being tungsten, and a layer consisting of tungsten by the latter layer to a disc consisting of the molybdenum alloy mentioned in Example I. The tungsten layer and the tungsten-niobium layer both were about 1 mm thick.

EXAMPLE III

According to the method described in example I a rotary anode was manufactured by joining a sintered member comprising a layer of a tungsten-rhenium-tantalum alloy containing 3% by weight of rhenium and 0.4% by weight of tantalum, the remainder being tungsten, and a layer consisting of tungsten by the tungsten layer to a disc consisting of the molybdenum alloy mentioned in Example I.

What is claimed is:

1. A laminated rotary anode for use in an X-ray tube having an electron target area, comprising:
   (a) an electron target layer consisting essentially of a first tungsten alloy;
   (b) a second layer bonded at a first face to said target layer and consisting essentially of one of tungsten and a second alloy of tungsten, said second layer material having a yield point lower than that of said first tungsten alloy; and (c) a support layer bonded to said second layer at a second face opposite to said target layer, said support layer consisting essentially of one of molybdenum and a molybdenum alloy.

2. A rotary anode as in claim 1, wherein said target layer consists essentially of a first tungsten-rhenium alloy suitable to serve as a target layer for the electrons, said second layer consists essentially of one of tungsten and a second tungsten-rhenium alloy having a lower rhenium content, and said support layer consists essentially of a molybdenum alloy which contains from 0.4% to 0.55% by weight of titanium and from 0.06% to 0.12% by weight of zirconium and the balance essentially molybdenum.

* * * * *